Patented Jan. 12, 1954

2,665,990

UNITED STATES PATENT OFFICE 2,665,990

CHEESE AND PROCESS OF PREPARING THE SAME

Stanley G. Knight, Madison, Wis., assignor to Wisconsin Alumni Research Foundation, Madison, Wis., a corporation of Wisconsin No Drawing. Application July 25, 1950, Serial No. 175,889

2 Claims. (Cl. 99—116)

The present invention relates to the cheese art and more specifically to roquefort-type cheese and improved processes of preparing the same.

The processes employed in the manufacture of roquefort-type or "blue-vein" cheese employing spores of the blue-green mold *Penicillium roqueforti* are well known in the cheese art. While the prior processes have been employed for quite sometime, the use of the mold *Penicillium roqueforti* with cow's milk in the manufacture of roquefort-type cheese has presented serious problems. One of the biggest problems in the roquefort-type or blue-vein cheese industry, for example, has been the failure in a considerable number of instances of the mold to grow or grow properly in the green cheese or curd. The cheese in which the mold does not grow or in which the mold grows poorly does not ripen and is a total loss. Up until the discoveries leading to the present invention, attempts by skilled investigators working in the art to solve the *Penicillium roqueforti* mold growth problem in the roquefort-type cheese industry had proven unsuccessful.

The principal object of the present invention is to provide an improved process for making roquefort-type cheese in which the mold grows very well and the resulting ripened cheese is of the desired high quality.

Other objects of the present invention will be apparent as the description proceeds hereinafter.

I have discovered two methods for enhancing the growth of the mold *Penicillium roqueforti* in the manufacture of roquefort-type cheese. One method calls for the addition of small amounts of iron to the cow's milk used in the manufacture of the cheese, while the other method calls for the use of a white mutant obtained by irradiation of the blue-green mold.

METHOD I—ADDITION OF IRON

I have discovered that the addition of small amounts of iron to cow's milk to be used in the manufacture of roquefort-type cheese will enhance the growth of the blue-green mold and will result in a more uniformly better quality of product. Any substantially non-toxic iron compound may be used including the inorganic and organic iron salts such as ferric chloride, ferrous sulfate, ferric sulfate, ferric acetate, ferric citrate, ferric lactate, etc. In addition, as my investigations show that only minute amounts (about 7 p. p. m.) of iron are necessary, metallic iron itself may be used as sufficient amounts of iron may be solubilized in the presence of the milk to produce the desired mold growth. Ordinarily it is preferred to employ a soluble iron salt and add sufficient salt to provide at least about 0.7 mg. of iron in solution for each 100 ml. of milk. More iron, however, may be employed if desired, although the use of over about 1.5 mg. of iron per 100 ml. of milk has not been found to have any appreciable beneficial effect on mold growth in roquefort-type cheese.

The following examples will serve to illustrate the growth of the colored mold in the absence of and presence of added iron.

Example 1

Whole cow's milk was placed in clean 100 ml. flasks, stoppered with cotton plugs, and sterilized by autoclaving at about 120° C. for fifteen minutes. Following sterilization, sterile dilute aqueous solutions of iron in the form of ferric chloride were added to the flasks in different quantities to provide a range from 0.17 mg. up to 1.38 mg. of iron per 100 ml. of milk. No iron was added to one flask which was maintained as a control.

Each 100 ml. of milk was then inoculated with 1 ml. of a twenty-four hour old cheese starter of the type used in the manufacture of roquefort-type or blue vein cheese. The starter was added in order to make the conditions of mold growth more comparable to roquefort-type cheese manufacture. The milk was then inoculated with about ½ ml. of a heavy suspension of spores in sterile distilled water, the spores used being from a culture of *Penicillium roqueforti* propagated on vegetable juice-agar in a culture tube. After inoculation the flasks were incubated at 25° C. and observed daily for growth and sporulation.

The green or bluish-green *Penicillium roqueforti* mold was found to grow rapidly and sporulate heavily in the flasks containing at least about 7 p. p. m. or more of iron in solution. In the flasks containing less iron or the control flask containing no iron, growth was slow and both growth and sporulation were light.

Example 2

The procedure employed in this example is similar to the procedure employed in Example 1 except that in place of ferric chloride, aqueous solutions of ferric citrate, ferric lactate and ferric sulfate were added to whole sterilized cows milk in amounts so that about 0.7 mg. of iron was added to each 100 ml. of milk. A control was also maintained as in Example 1.

In the control containing no added iron the green *Penicillium roqueforti* grew and sporulated poorly. In the other flasks containing about 0.7 mg. of iron per 100 ml. of milk in the forms listed above, the mold growth was good and sporulation was heavy.

The illustrative results given above have also been found to correspond with the results obtained in actual roquefort-type cheese manufacture. Where up to at least 7 p. p. m. of iron was added to the milk the green mold was found to grow very well and the resulting ripened cheese to be uniform and of the desired high quality.

METHOD II—WHITE MUTANTS

I have also discovered that white or colorless mutants of *Penicillium roqueforti* obtained by irradiation of the blue-green mold grow very well in ordinary cows milk or curd or green cheese made therefrom. More specifically, I have discovered that the white mutants, unlike the colored or blue-green mold, grow and sporulate in the desired manner without the addition of iron and that the resulting ripened cheese is of the desired high quality. In this process the spores of the colored mold *Penicillium roqueforti* used for the manufacture of roquefort-type or blue-vein cheese, are irradiated with ultraviolet rays such as obtainable from a 30 watt cold cathode ultraviolet lamp, 80% of the irradiation being 2537 Å. in wave length. With this type of lamp the spores were irradiated for periods of 10, 15, 20 and 25 minutes at a distance of about 18–20 cm. from the lamp. Under these conditions irradiation altered the majority of the spores (90% or more) so that they did not germinate when placed upon a medium suitable for growth. While investigations show that irradiation is not particularly critical and that various combinations of time and distance can be used, the irradiation, however, should be such as to kill a majority of the spores.

After irradiation the spores are placed on or allowed to remain on a medium suitable for germination and growth and are incubated at a temperature at about 25–30° C. After about two days of incubation the incubation plates are examined daily for molds that have developed from spores that have survived the irradiation but have been caused to mutate so that their spores are white. Spores are then picked from the white mutants and placed on a suitable medium for propagation. The medium used in the examples given below was a vegetable juice-agar made by mixing equal parts of sterile "V-8" vegetable juice and 6% agar. Any nutritive medium suitable for the growth and sporulation of *Penicillium roqueforti*, however, may be used. After propagation the spores are ready for use in the manufacture of roquefort-type cheese in the usual manner.

*Example 3*

Spores from a slant culture of *Penicillium roqueforti* (U. M.-1) were suspended in 5 ml. of sterile distilled water and 2 ml. of the suspension placed in a petri dish. With the lid removed, the spore suspension was irradiated for 20 minutes with the rays of the cold cathode ultraviolet lamp referred to above at a distance of about 19–20 cm. After irradiation one-quarter ml. aliquots of the suspension were spread on a surface of the vegetable juice-agar medium contained in a sterile petri dish and incubated at 25° C. until the surviving spores germinated and formed sporulated colonies. Spores from a white colony were then isolated and placed on the vegetable juice-agar medium in a culture tube and propagated at about 25–30° C.

*Example 4*

Spores from a slant culture *Penicillium roqueforti* (U. M.-2) were suspended in 5 ml. of sterile distilled water and 1 ml. of the spore suspension was spread on the surface of the sterile vegetable juice-agar medium in a petri dish. A number of such plated suspensions were made and irradiated for about 20 minutes at a distance of 18–20 cm. from the lamp as described in Example 3. After irradiation the covers were returned to the petri dishes and the dishes were incubated at 30° C. The spores of the white molds that developed during incubation were isolated and placed on the vegetable juice-agar medium in a culture tube and propagated.

Investigations have shown the lipolytic and proteolytic (cheese ripening) properties of the white or colorless mutants to be of the type desired. Roquefort-type cheese, for example, made in the conventional manner from cow's milk except for the use of white *Penicillium roqueforti*, has been found to be as good or better than roquefort-type cheese made from colored mold and to be generally superior in flavor and quality to roquefort-type cheese made from the colored mold and cow's milk without the addition of iron.

Cheese made using white mutants does not contain the colored venation characteristic of the blue-vein cheese. This property, however, makes it particularly adaptable for use in the manufacture of roquefort-type cheese spreads and blends where the blue-green color is objectionable and white colored products are desired. The white mutants also make it possible to manufacture cheese with new flavors, textures and other properties that are of value in producing new cheese foods and in developing wider consumer appeal.

I claim:

1. In the process of preparing cheese from cow's milk employing the mold *Penicillium roqueforti*, the improvement which comprises in making the cheese free from colored venation characteristic of blue-vein cheese, by using a white mutant obtained by irradiation of blue-green *Penicillium roqueforti*.

2. Cheese ripened by a white mutant of *Penicillium roqueforti*, said cheese being free from colored venation characteristic of blue-vein cheese.

STANLEY G. KNIGHT.

References Cited in the file of this patent

UNITED STATES PATENTS

| Number | Name | Date |
|---|---|---|
| 2,445,748 | Demerec | July 27, 1948 |

OTHER REFERENCES

"Manufacture of Cow's Milk Roquefort Cheese," U. S. Dept. of Agriculture, Bulletin No. 970, Aug. 29, 1921, Wash., D. C.

"Bacteriology of Cheese—III. Some Factors Affecting the Ripening of Blue (Roquefort Type) Cheese," by C. B. Lane and B. W. Hammer, Agricultural Experiment Station, Iowa State College of Agriculture & Mechanic Arts, Research Bulletin 237, Aug., 1938 Ames, Iowa.

"Fungi," vol. II, Wolf and Wolf—John Wiley & Sons, Inc., N. Y., page 13.